United States Patent
Jung et al.

(10) Patent No.: US 11,533,277 B2
(45) Date of Patent: Dec. 20, 2022

(54) METHOD AND SYSTEM FOR VIRTUAL CHANNEL REMAPPING

(71) Applicant: Hewlett Packard Enterprise Development LP, Houston, TX (US)

(72) Inventors: Jason D. Jung, Fort Collins, CO (US); Norell E. Menhusen, Fort Collins, CO (US); Christopher M. Brueggen, Allen, TX (US); David M. Olson, Grapeland, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/176,827

(22) Filed: Feb. 16, 2021

(65) Prior Publication Data

US 2022/0263775 A1 Aug. 18, 2022

(51) Int. Cl.
*H04L 49/109* (2022.01)
*H04L 49/00* (2022.01)
*H04L 47/10* (2022.01)
*H04L 47/41* (2022.01)

(52) U.S. Cl.
CPC .......... *H04L 49/3045* (2013.01); *H04L 47/39* (2013.01); *H04L 47/41* (2013.01); *H04L 49/3027* (2013.01)

(58) Field of Classification Search
None
See application file for complete search history.

(56) References Cited

U.S. PATENT DOCUMENTS

| | | | |
|---|---|---|---|
| 7,742,408 B2 | 6/2010 | Miyoshi et al. | |
| 7,852,836 B2 | 12/2010 | Scott et al. | |
| 8,379,659 B2 | 2/2013 | Vangal et al. | |
| 8,498,213 B2 | 7/2013 | Gnanasekarau et al. | |
| 9,258,257 B2 | 2/2016 | Malik et al. | |
| 10,505,855 B2 | 12/2019 | Kollu et al. | |
| 10,693,811 B2 | 6/2020 | Lesarte et al. | |
| 2008/0123525 A1* | 5/2008 | Miyoshi | H04L 49/358 370/389 |
| 2008/0151909 A1* | 6/2008 | Scott | G06F 11/0781 370/400 |
| 2011/0235531 A1* | 9/2011 | Vangal | H04L 49/109 370/252 |
| 2012/0063329 A1* | 3/2012 | Gnanasekaran | H04L 47/32 370/248 |

(Continued)

*Primary Examiner* — Brandon M Renner
(74) *Attorney, Agent, or Firm* — Park, Vaughan, Fleming & Dowler LLP

(57) ABSTRACT

A virtual channel (VC) allocation system is provided. During operation, the system can maintain, at an ingress port of a switch, a set of counters. A respective counter can indicate a number of data units queued at a corresponding egress port for an ingress VC. A data unit can indicate a minimum number of bits needed to form a packet. The system can maintain, at an egress port, an ingress VC indicator indicating that a packet in an egress buffer for an egress VC corresponds to the ingress VC. Upon sending the packet, the system can update a counter based on the ingress VC indicator. The counter can be associated with the egress buffer and the ingress VC. The system can then issue, to a sender device, credits associated with the ingress VC based on a minimum number of available data units indicated by the set of counters.

20 Claims, 10 Drawing Sheets

(56) References Cited

U.S. PATENT DOCUMENTS

| | | | |
|---|---|---|---|
| 2014/0195630 A1* | 7/2014 | Malik | G06F 13/28 |
| | | | 709/212 |
| 2018/0159786 A1* | 6/2018 | Rowlands | H04L 49/109 |
| 2018/0198722 A1* | 7/2018 | Kollu | H04L 47/35 |
| 2020/0106718 A1* | 4/2020 | Lesartre | H04L 47/6275 |

* cited by examiner

METHOD AND SYSTEM FOR VIRTUAL CHANNEL REMAPPING

BACKGROUND

Field

The present disclosure relates to communication networks. More specifically, the present disclosure relates to a method and system facilitating efficient credit allocation for virtual channel (VC) management and remapping.

BRIEF DESCRIPTION OF THE FIGURES

In the figures, like reference numerals refer to the same figure elements.

DETAILED DESCRIPTION

Figure 1A:
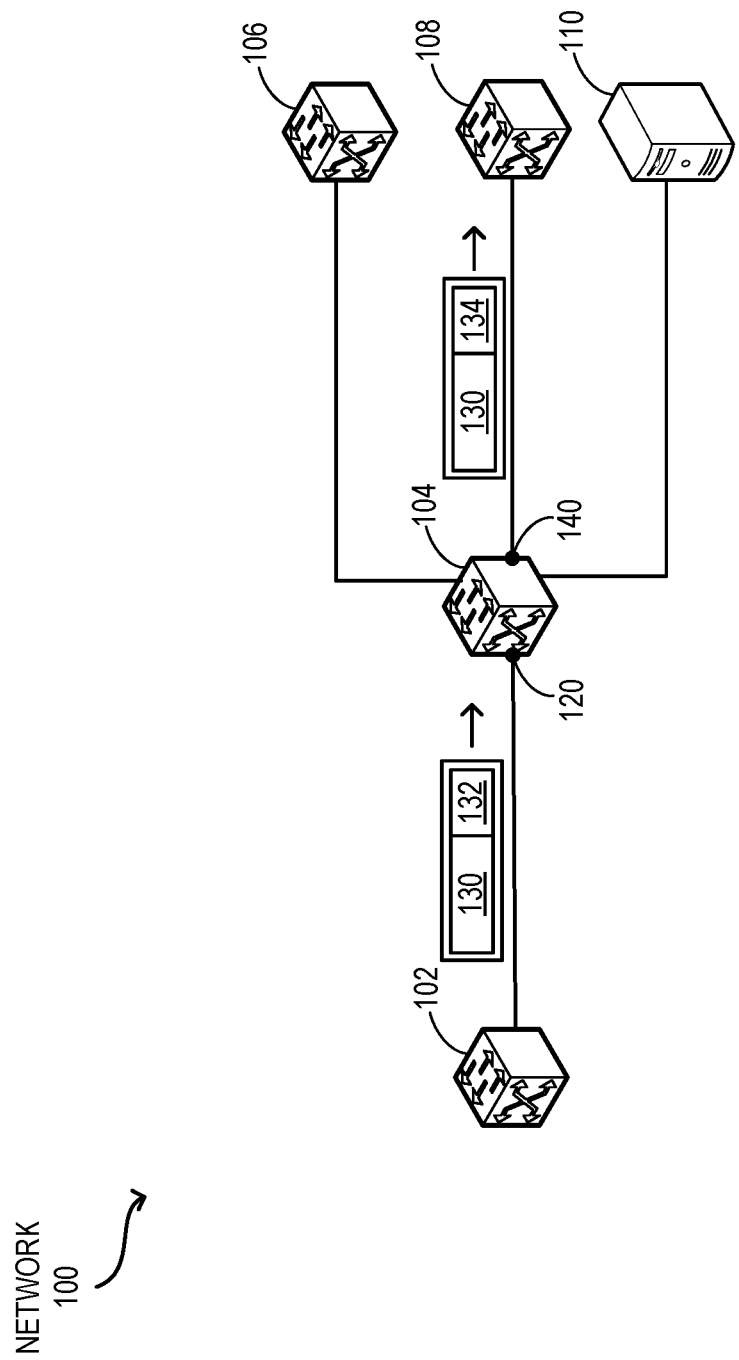
FIG. 1A illustrates an exemplary network supporting low-overhead credit allocation for facilitating efficient VC remapping, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Internet is the delivery medium for a variety of applications running on physical and virtual devices. Such applications have brought with them an increasing demand for bandwidth. As a result, equipment vendors race to build larger devices with significant processing capabilities. However, the processing capability of a device may not be sufficient to keep up with complex systems that run on such devices. For example, software systems may require a significant number of processing cycles and increasing amounts of memory bus bandwidth. Even with significant processing capability, these devices may not be able to provide the desired level of performance for complex systems.

A flexible and efficient way to meet the requirements of complex systems can be based on memory-semantic communications. Memory-semantic communication facilitates data exchange between memory modules located on different devices (or components) with low latency. Unifying the communication paths by using memory-semantic communication may eliminate bottlenecks and improve efficiency and performance. To provide data to the processor as quickly and as efficiently as possible, the memory bus is designed as a high-bandwidth, low-latency interface based on simple instructions. As a result, systems run well when run in memory.

Therefore, memory-semantic communication can enhance the computing capabilities of the devices by reducing overhead. Gen-Z is a memory-semantic fabric that can be used to communicate to the devices in a computing environment. By unifying the communication paths and simplifying software through simple memory-semantics, Gen-Z switches can facilitate high-performance solutions for complex systems. While memory-semantic communication can bring many desirable features to a computing environment, some issues remain unsolved regarding VC management and remapping in a switch.

One embodiment of the present technology provides a system for allocating credits for a virtual channel (VC). During operation, the system can maintain, at an ingress port of a switch, a set of counters. A respective counter can indicate a number of data units queued at a corresponding egress port for an ingress VC. A data unit can indicate a minimum number of bits needed to form a packet. The system can maintain, at an egress port, an ingress VC indicator indicating that a packet in an egress buffer for an egress VC corresponds to the ingress VC. When the packet is sent via the egress port from the egress buffer, the system can update a counter of the set of counters based on the ingress VC indicator. The counter can be associated with the egress buffer and the ingress VC. The system can then issue, to a sender device, credits associated with the ingress VC based on a minimum number of available data units indicated by the set of counters.

In a variation on this embodiment, the system can send, from the egress port to the ingress port, a notification indicating packet transmission associated with the ingress VC.

In a variation on this embodiment, a respective VC indicates a class of traffic at the switch.

In a variation on this embodiment, the system can send the packet, the ingress VC indicator, and an egress VC indicator from the ingress port to the egress port. The system can then identify the egress buffer based on the egress VC indicator.

In a further variation, the system can send the packet from the ingress port to the egress port by sending a respective data unit of the packet individually. The system can send the ingress VC indicator and an egress VC indicator with each data unit.

In a variation on this embodiment, a respective egress buffer associated with a corresponding egress VC is stored in a shared memory device in the egress port.

In a further variation, the system can store the ingress VC indicator in a sideband of the shared memory device and obtain the ingress VC indicator based on a memory location of the packet in the egress buffer.

In a variation on this embodiment, upon receiving the packet from the sender device, the system can increment the counter by a number of data units in the packet. The system can then update the counter by decrementing the counter by a respective data unit of the packet sent by the egress port.

In a variation on this embodiment, the system can determine the largest counter value from the set of counters. The system can also determine a difference between a maximum counter value and the largest counter value as the minimum number of available data units for the ingress VC.

In a variation on this embodiment, the system can determine a number of pending credits allocated to the sender device for the ingress VC. If the minimum number of available data units for the ingress VC is larger than the number of pending credits, the system can issue the credits associated with the ingress VC.

The embodiments described herein solve the problem of allocating credits to a sender device with low overhead for facilitating efficient VC remapping in a switch by (i) maintaining IVC information in association with a respective packet stored at an egress port; and (ii) updating IVC counters, which indicate a number of data units that have been transmitted via a corresponding egress port for a respective IVC, based on the IVC information. In this way, the switch can ensure that, even if the VC of a packet is remapped to an egress VC (EVC), the ingress port can obtain the IVC information and update the corresponding IVC counter. The switch can then allocate credits for the IVC based on the values of the IVC counters.

With existing technologies, a switch can be equipped with a plurality of ports. A respective port can be coupled to a sender and/or destination device of a dataflow. Examples of such a device can include, but are not limited to, a network device (e.g., a switch or router), a user device (e.g., a cellular phone, personal computer, or smart device), an application running on a device (e.g., a piece of software on a computer or an app on a phone), and a virtual device (e.g., a virtual machine (VM) and a virtual switch). A respective port coupled to a source of a dataflow can be referred to as an ingress port of the dataflow. Similarly, a respective port coupled to a destination of a dataflow can be referred to as an egress port of the dataflow. The switch may support the separation of dataflows on a link coupled to a port. A respective dataflow can indicate a class of data traffic or be defined based on a policy (e.g., a source-destination pair). A class of traffic can be based on a standard, such as the Institute of Electrical and Electronics Engineers (IEEE) 802.1P, and a type of traffic, such as video or audio traffic.

The switch may use a virtual channel (VC) to represent one or more dataflows. In some network topologies, such as a dragonfly or torus topology, a packet's VC may become remapped. VC remapping can indicate a change of VC from an ingress (or input) port to an egress (or output) port. A respective port can include a port capable of receiving and transmitting a packet and the control logic block and memory module for the port. The ingress port may advertise, to a sender device, how many data units of an ingress VC (IVC) the switch may support so that the sender device does not cause an overflow at a destination device. On the other hand, a respective egress port can track available storage for a particular VC at a destination device. For example, a respective destination device may have requirements on what VCs the destination device can receive traffic. To accommodate the VC requirements of a destination device, the switch can remap (or translate) the IVC of a packet into a corresponding egress VC (EVC).

The control logic block of the ingress port can also include a routing logic block that can determine one or more egress ports for a packet. Furthermore, the same ingress port may receive traffic destined to different destination devices. Consequently, the packets from an ingress port may be steered to a plurality of egress ports, each with a different EVC. Since an IVC may not be mapped to one particular EVC, multiple packets with the same IVC can be remapped with different EVCs. However, the ingress port may not be aware of how an EVC would be selected for a packet that hasn't been received yet. Hence, to avoid overwhelming a particular EVC, the switch may need to determine the fullest egress buffer that it can send to before issuing any credits for a VC to the sender device. In addition, if the switch stores egress packets based on the corresponding EVCs, the switch may need to track multiple destinations for each EVC since a packet can be forwarded to any destination supporting that EVC.

To solve this problem, the ingress port can maintain a set of IVC counters. The switch can include an IVC counter for a respective IVC per egress port. In other words, the IVC counter can indicate the number of data units that are associated with a specific IVC and sent to a particular egress port. The data unit can indicate the minimum number of bits used to compose a packet. For a Gen-Z network, the data unit can be a flit. Similarly, for an Internet Protocol (IP) version 4 network, the data unit can correspond to 20 bytes (e.g., an IP header without data). During operation, a sender coupled to the switch can send a packet associated with an IVC to an ingress port of the switch. The packet can include one or more data units. The routing logic block of the ingress port can determine an egress port and an EVC for the packet based on the packet's information.

The ingress port can then provide the packet to the egress port and determine the number of data units sent to the egress port. The ingress port can also provide the IVC and EVC indicators associated with the packet to the egress port. The IVC and EVC indicators can include channel identifiers (e.g., integer values) of IVC and EVC, respectively. The ingress port can then increment an IVC counter associated with the IVC of the packet and the egress port. The number of increments to the IVC counter can correspond to the number of data units in the packet. The egress port can receive the packet and store a respective data unit of the packet in a virtual buffer associated with the EVC. The virtual buffer can be represented by a data structure, such as a linked-list. The egress port can include a dual-port memory device that can support simultaneous read and write operations and store the data structure associated with a respective EVC. The memory device, therefore, can be shared among the EVCs.

The egress port can also store the IVC information in an additional memory band (e.g., a sideband memory). The sideband memory can be referred to as an IVC sideband. The IVC sideband can be in a reserved portion of the memory device or an additional memory device. In some embodiments, each memory location (e.g., expressed in data units) in the memory device can have a dedicated memory location in the IVC sideband. If a data unit of a packet is stored at a location of the memory device, the IVC information of the packet is stored in the corresponding location of the IVC sideband.

The egress port can determine whether sufficient destination credit associated with the EVC is available. If sufficient destination credit is available, the egress port can transmit a respective data unit of the packet to the destination. Each destination credit can allow the egress port to transmit one data unit. Upon transmitting a respective data unit of the packet, the egress port can notify the ingress port regarding the corresponding IVC. The egress port can determine the IVC information from the location in the IVC sideband that corresponds to a location of the memory device that has stored the data unit. The ingress port can then decrement the IVC counter associated with the IVC and the egress port. In this way, for a respective data unit sent to the destination, the corresponding IVC counter is decremented.

The ingress port can also maintain a set of sender credit counters. A respective sender credit counter can correspond to an IVC and allows the sender to send one data unit to the ingress port. When an IVC counter is decremented, the ingress port determines the fullest egress queue for the IVC. To do so, the ingress port can compare the IVC counter values associated with the IVC and a respective egress port. The ingress port can then select the largest IVC counter value and determine a difference between a maximum counter value (i.e., the maximum value that the IVC counter can count to) and the selected IVC counter value. The difference can indicate a minimum number of available data units for the IVC. If the difference is larger than the pending (or unused) sender credits for the IVC, the ingress port can send more sender credits such that the total unused sender credits match the difference. In this way, the switch can support low-overhead credit allocation for facilitating efficient VC remapping.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Network Architecture

FIG. 1A illustrates an exemplary network supporting low-overhead credit allocation for facilitating efficient VC remapping, in accordance with an embodiment of the present application. A network 100 includes switches 102, 104, 106, and 108. Network 100 can also include a user device 110 coupled to switch 104. In some embodiments, network 100 is a Gen-Z network, and a respective switch of network 100, such as switch 104, is a Gen-Z component. Under such a scenario, communication among the switches in network 100 is based on memory-semantic communications. A respective packet forwarded via network 100 may be referred to as a transaction, and the corresponding data unit can be a flit. In some further embodiments, network 100 can be an Ethernet, InfiniBand, or other network, and may use a corresponding communication protocol, such as Internet Protocol (IP), FibreChannel over Ethernet (FCoE), or other protocol.

As illustrated in FIG. 1A, switches 102 and 108 can be coupled to ports 120 and 140 of switch 104, respectively. During operation, switch 102 can send a packet 130 (e.g., a Gen-Z transaction) to switch 104. Upon receiving packet 130, ingress port 120 of switch 104 can determine that packet 130 should be directed to switch 108 based on the information of packet 130. Accordingly, switch 104 can forward packet 130 via port 140. Hence, switches 102 and 108 can be the sender and the destination for packet 130. Here, the destination may indicate a destination from switch 104's perspective and not the final destination of packet 130. Furthermore, ports 120 and 140 can be the ingress and egress ports for packet 130. Switch 104 may support the separation of dataflows on links coupled to ports 120 and 140.

A respective dataflow can indicate a class of data traffic or be defined based on a policy (e.g., a source-destination pair). A class of traffic can be based on a standard, such as IEEE 802.1P, and a type of traffic, such as video or audio traffic. Switch 104 may use a VC to represent one or more dataflows. To support the VCs in destination switch 108, packet 130's VC may become remapped. VC remapping can indicate a change of VC from an ingress port 120 to egress port 140. For example, Switch 104 may receive packet 130 on VC 132. Based on the VC support of switch 108, switch 104 can remap the VC of packet 130 to VC 134 and forward packet 130 to 108. Hence, the IVC and EVC for packet 130 can be VC 132 and VC 134, respectively.

To solve the problem of allocating credits to switch 102 with low overhead for facilitating efficient VC remapping from IVC 132 to EVC 134, switch 104 can store packet 130 in a buffer in egress port 140 and information associated with IVC 132, such as an IVC indicator (e.g., a channel identifier identifying IVC 132), in association with packet 130. Ingress port 120 of switch 104 can also maintain a set of IVC counters. A respective IVC counter can indicate a number of data units transmitted via an egress port for a respective IVC. The data unit can indicate the minimum number of bits used to compose a packet and can be a deployment-specific unit based on which the flow control for network 100 may operate. For a Gen-Z network, the data unit can be a flit. Similarly, for an IPv4 network, the data unit can correspond to 20 bytes (header without data).

Upon receiving packet 130, ingress port 120 increments the IVC counter associated with IVC 132 and egress port 140 based on the packet length in data units. For example, if the length of packet 130 is two data units (e.g., packet 130 includes two data units), the IVC counter can be incremented by two. It should be noted that if the number of data units in packet 130 is a fraction between 1 and 2, ingress port 120 may consider the length of packet 130 as two data units. When packet 130 is transmitted via egress port 140, ingress port 120 can receive IVC information from egress port 140. The information can indicate that packet 130 has been associated with IVC 132.

Based on the information, ingress port 120 decrements the IVC counter associated with IVC 132 and egress port 140. For example, if packet 130 includes two data units, the IVC counter is decremented by two. In this way, switch 104 can ensure that, even if packet 130 is remapped to EVC 134, ingress port 120 can obtain information associated with IVC 132 (e.g., an IVC indicator) and update the corresponding IVC counter. Switch 104 can then allocate credits for IVC 132 to switch 102 based on the values of the IVC counters.

Figure 1B:
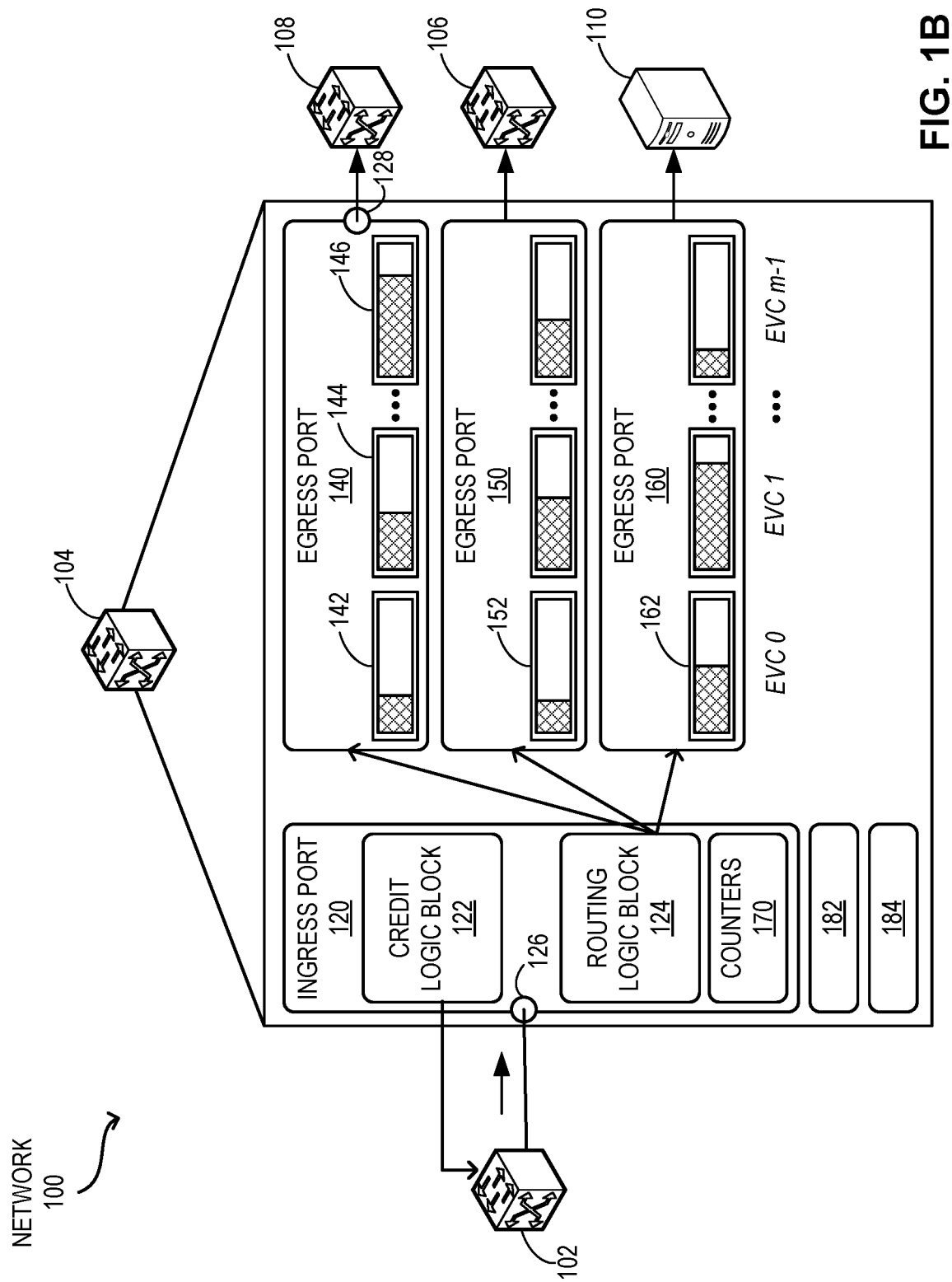
FIG. 1B illustrates an exemplary switch structure supporting low-overhead credit allocation for facilitating efficient VC remapping, in accordance with an embodiment of the present application.

FIG. 1B illustrates an exemplary switch structure supporting low-overhead credit allocation for facilitating efficient VC remapping, in accordance with an embodiment of the present application. Switch 104 can include a number of ingress ports 120, 182, and 184. Switch 104 can also include a number of egress ports 140, 150, and 160 coupled to switches 108 and 106, and user device 110, respectively. Therefore, a destination device can be a network device (e.g., switches 106 and 108) and a user device (e.g., device 110). The destination can also be an application running on device 110 (e.g., an app on a phone). One or more of switches 106 and 108, and device 110 can be a VM. A respective port of switch 104 can include a port capable of coupling a link for receiving and transmitting a packet.

A respective port can also include the control logic block and memory for the port. For example, ingress port 120 can include port 126 that can couple a cable, or establish a wireless connection (e.g., operate as a wireless interface) to connect to switch 102. Similarly, egress port 140 can include port 128 that can couple a cable, or establish a wireless connection to connect to switch 108. Ingress port 120 can also include a credit logic block 122 for allocating credits to switch 102 and a routing logic block 124 for determining an egress port and EVC for a respective packet received via ingress port 120. With existing technologies, for dataflows from switch 102, credit logic block 122 of ingress port 120 may advertise how many data units of an IVC switch 104 may support so that switch 102 does not cause an overflow at the local egress buffers.

On the other hand, a respective egress port can track the available storage for a particular VC at a corresponding destination device. For example, egress port 140 can track the available storage for a respective VC at switch 108. However, switch 108 may have requirements on what VCs switch 108 can receive traffic. To accommodate the VC requirements of switch 108, routing logic block 124 of ingress port 120 can remap (or translate) the IVC of a packet into a corresponding EVC. As a result, ingress port 120 may not be aware of the VC on which a packet is forwarded to a destination.

Routing logic block 124 can also determine one or more egress ports for a packet. Furthermore, the same ingress port 120 may forward to different destination devices, such as switches 106 and 108, and user device 110. Upon receiving a packet, an egress port, such as egress port 140, can store the packet in an egress buffer associated with the EVC of the packet. If switch 104 facilitates m EVCs, egress port 140 can maintain m egress buffers, which can include egress buffers 142, 144, and 146 for EVCs 0, 1, and (m−1), respectively. In this way, a respective egress port maintains an egress buffer for a respective EVC. For example, egress ports 140, 150, and 160 can maintain egress buffers 142, 152, and 162, respectively, for EVC 0.

Since the packets from ingress port 120 can be destined to any of switch 106, switch 108, and user device 110, the packets from ingress port 120 may be steered to any of egress ports 140, 150, and 160. Furthermore, the destination devices may support different EVCs. Hence, the packets can have different EVCs than their IVCs. Since an IVC may not be mapped to one particular EVC, routing logic block 124 may remap multiple packets with the same IVC to different EVCs. Ingress port 120 may not be aware of how an EVC would be selected for a packet that hasn't been received yet. Accordingly, an incoming packet might be sent on EVC j and egress port k that are coupled to the fullest possible ingress queue at one of the connected destination devices. Hence, to avoid overwhelming a destination device, switch 104 may need to determine the fullest egress buffer that it can send to before issuing any credits for a VC to switch 102. In addition, switch 104 can store packets of EVC 0 in egress buffers 142, 152, and 156. Hence, ingress port 120 may need to track multiple destinations for each EVC, such as EVC 0, since a packet can be forwarded to any of switch 106, switch 108, and user device 110.

To solve this problem, ingress port 120 can maintain a set of IVC counters 170. Counters 170 can include an IVC counter for each of the m IVCs for each of egress ports 140, 150, and 160. In other words, a respective IVC counter can indicate the number of data units that are associated with a specific IVC of the m IVCs and sent to a particular egress port of egress ports 140, 150, and 160. Therefore, if switch 104 supports x number of egress ports, ingress port 120 may need to maintain m*x number of counters. When switch 102 sends a packet associated with an IVC i to ingress port 120, routing logic block 124 can determine that the packet should be forwarded to an egress port k. Accordingly, ingress port 120 can increment the IVC counter associated with IVC i and egress port k based on the number of data units in the packet. On the other hand, based on IVC information from egress port k, ingress port 120 can decrement the IVC counter when a packet, which has arrived at switch 104 with IVC i, is transmitted.

Figure 2:
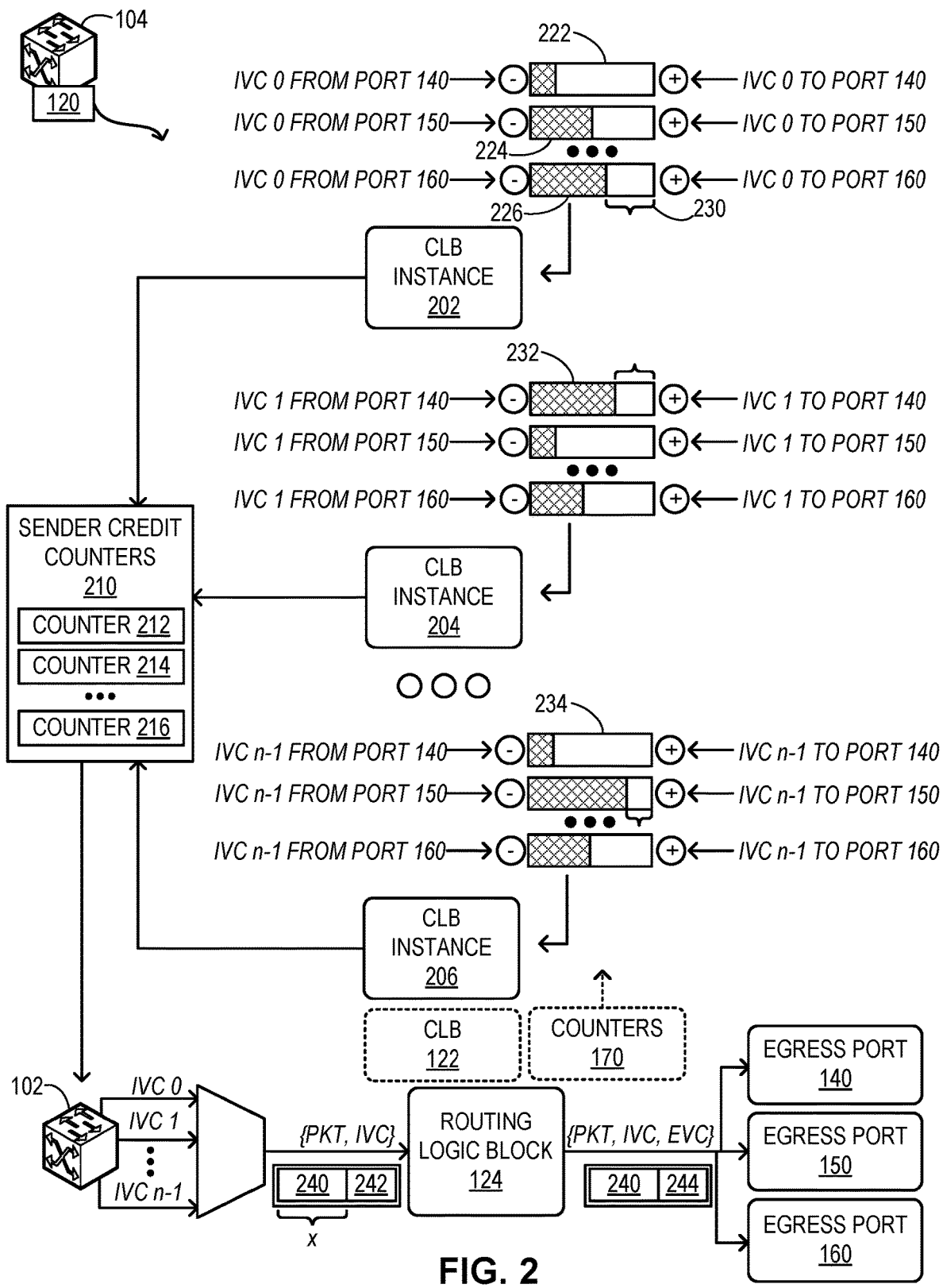
FIG. 2 illustrates an exemplary ingress port structure supporting low-overhead credit allocation for facilitating efficient VC remapping, in accordance with an embodiment of the present application.

In the example in FIG. 2, when switch 102 sends a packet associated with IVC 0 to ingress port 120, routing logic block 124 can determine that the packet should be forwarded to egress port 150. Accordingly, ingress port 120 can increment the IVC counter associated with IVC 0 based on the number of data units in the packet. Similarly, based on IVC information from egress port 150, ingress port 120 can decrement the IVC counter when a packet, which has arrived at switch 104 with IVC 0, is transmitted. Credit logic block 122 can then allocate credits for IVC 0 to switch 102 based on the values of IVC counters that are associated with IVC 0 and maintained for egress ports 140, 150, and 160.

FIG. 2 illustrates an exemplary ingress port structure supporting low-overhead credit allocation for facilitating efficient VC remapping, in accordance with an embodiment of the present application. Suppose that switch 104 can receive traffic associated with n IVCs from switch 102. For each packet, such as a packet 240, switch 102 can send the packet and an indicator indicating the IVC 242 of packet 240 to switch 104. Packet 240 can include header and payload. The length of packet 240 can be represented as a multiple of data units. Routing logic block 124 can use the header information of packet 240 to determine the egress port (e.g., one of egress ports 140, 150, and 160) for packet 240. Routing logic block 124 may also remap IVC 242 of packet 240 to a corresponding EVC 244, which can be different from IVC 242. Routing logic block 124 can then provide packet 240, IVC 242, and EVC 244 to the egress port. In some embodiments, ingress port 120 can send packet 240 one data unit at a time and include information indicating IVC 242 and EVC 244 with each data unit. It should be noted that a VC may not be remapped to a different VC (e.g., IVC 242 and EVC 244 can be the same VC).

Counters 170 of ingress port 120 can include one IVC counter for each IVC and egress port pair. For example, counters 170 can include counters 222, 224, and 226 for egress ports 140, 150, and 160, respectively, for IVC 0. Similarly, counters 170 can include counters 222, 232, and 234 for IVCs 0, 1, and n−1, respectively, for egress port 140. Instances 202, 204, and 206 of credit logic block 122 can maintain the counters associated with IVCs 0, 1, and n−1, respectively. Upon providing packet 240 to the egress port, ingress port 120 can determine the number of data units in packet 240 sent to the egress port. Suppose that packet 240 can include x number of data units. Ingress port 120 can then increment the IVC counter associated with IVC 242 of packet 240 and the egress port. For example, if IVC 242 is IVC 0 and the egress port is port 150, instance 202 can increment IVC counter 224 by x. On the other hand, if IVC 242 is IVC 1 and the egress port is port 140, instance 204 can increment IVC counter 232 by x.

Suppose that the egress port is port 150. Egress port 150 can then receive packet 240 and store each of x data units of packet 240 in a virtual buffer associated with EVC 244. Egress port 150 can also store information associated with IVC 242 (e.g., an IVC indicator) in association with packet 240. Based on a trigger (e.g., the arrival of a new packet) or periodical checking, egress port 150 can determine whether sufficient destination credit associated with EVC 244 is available. If sufficient destination credit is available, egress port 150 can transmit each of x data units of packet 240 to the destination reachable via egress port 150. Upon transmitting a respective data unit of packet 240, egress port 150 can notify ingress port 120 regarding IVC 242 based on the stored information. The corresponding credit logic block instance at ingress port 120 can then decrement the IVC counter associated with IVC 242 and egress port 150. For example, if IVC 242 is IVC 0, instance 202 can decrement IVC counter 224 upon the transmission of a respective data unit.

Ingress port 120 can also maintain a set of sender credit counters 210. A respective sender credit counter of counters 210 can correspond to an IVC and indicate the number of data units switch 102 is allowed to send to ingress port 120. Counters 210 can include counters 212, 214, and 216 associated with IVCs 0, 1, and (n−1), respectively. If IVC counter 224 is decremented, credit logic block 122 can determine the fullest egress queue for IVC 0. To do so, credit logic block 122 can compare the values of IVC counters 222, 224, and 226 that are associated with IVC 0. Credit logic block 122 can then select the IVC counter with the largest value. In this example, IVC counter 226 has the largest value. Subsequently, credit logic block 122 can determine a difference 230 between a maximum counter value of an IVC counter (i.e., the maximum value that the IVC counter can count to) and the value of IVC counter 226. The maximum counter value can indicate the maximum number of data units of a particular VC that the destination device can receive without overflowing the ingress buffer. Therefore, difference 230 can indicate a minimum number of available data units for IVC 0.

Credit logic block 122 can also obtain the value of counter 212, which is associated with IVC 0. The value of counter 212 can indicate the pending (or unused) credits for IVC 0 that have been allocated to switch 102. If difference 230 is larger than the value of counter 212, credit logic block 122 can send more sender credits to switch 102 such that the total unused sender credits match difference 230. Furthermore, credit logic block 122 can increment the value of counter 212 to difference 230 to reflect the updated pending credits for IVC 0 that have been allocated to switch 102. In this way, credit logic block 122 of ingress port 120 can support low-overhead credit allocation for facilitating efficient VC remapping between IVC 242 and EVC 244.

Figure 3:
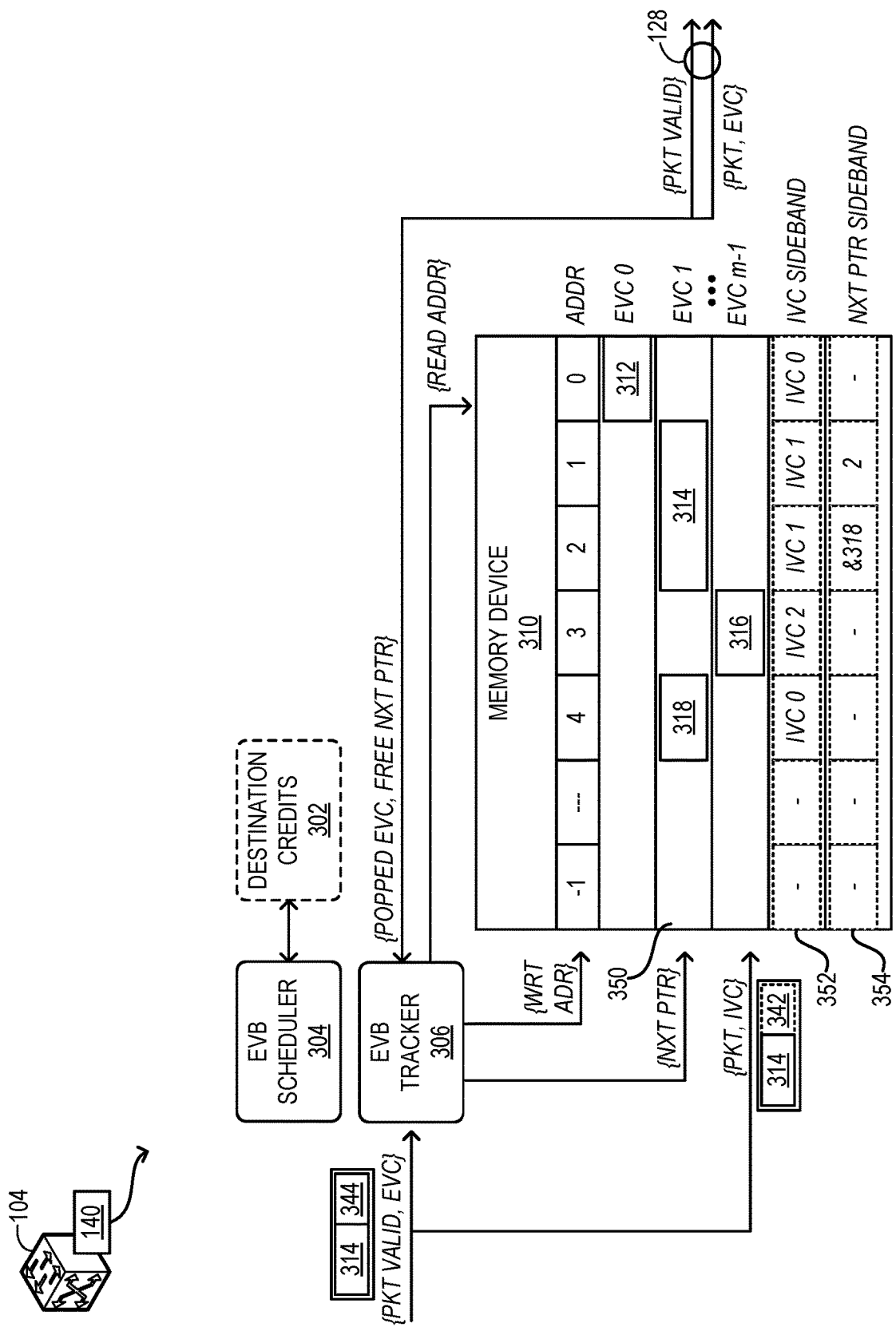
FIG. 3 illustrates an exemplary egress port structure supporting low-overhead credit allocation for facilitating efficient VC remapping, in accordance with an embodiment of the present application.

FIG. 3 illustrates an exemplary egress port structure supporting low-overhead credit allocation for facilitating efficient VC remapping, in accordance with an embodiment of the present application. Egress port 140 can be equipped with an egress virtual buffer (EVB) scheduler 304, an EVB tracker 306, and a shared memory device 310. A respective virtual buffer can be represented by a data structure, such as a linked-list, stored in memory device 310. Memory device 310, therefore, can be shared among the EVCs. In some embodiments, memory device 310 can include a dual-port memory device that can support simultaneous read and write operations. A respective data structure can be associated with a corresponding EVC.

During operation, egress port 140 of switch 102 can receive a packet 314 and information indicating IVC 342 and EVC 344 of packet 314 from an ingress port (e.g., ingress port 120 of FIG. 2). In some embodiments, egress port 140 may obtain packet 314 one data unit at a time from the ingress port. Egress port 140 may receive information indicating IVC 342 and EVC 344 (e.g., channel identifiers of IVC 342 and EVC 344, respectively) with a respective data unit of packet 314. EVB tracker 306 can maintain a mapping between a respective EVC and the corresponding data structure (e.g., a head pointer for the corresponding linked list). Based on the mapping, EVB tracker 306 can identify a virtual buffer 350 associated with EVC 344 and store the received data unit of packet 314. For example, if EVC 344 is EVC 1, EVB tracker 306 can identify virtual buffer 350 associated with EVC 1 in memory device 310 and store the data unit at the next available memory location of virtual buffer 350.

In some embodiments, the next available memory location of a virtual buffer (e.g., a next pointer for the corresponding linked list) can be stored in an additional memory band 354 (e.g., a sideband memory). This sideband memory 354 can be referred to as a next-pointer sideband. Similarly, egress port 140 can also store the IVC information in a sideband memory 352, which can be referred to as an IVC sideband. IVC sideband 352 and next-pointer sideband 354 can be in a reserved portion of the memory device or an additional memory device. In some embodiments, each memory location (e.g., expressed in data units) in memory device 310 can have respective dedicated memory locations in IVC sideband 352 and next-pointer sideband 354. When a data unit of packet 314 is stored at the next available location of virtual buffer 350, the information associated with IVC 342 (e.g., IVC 1) can be stored in the corresponding location of IVC sideband 352. The next available location in virtual buffer 350 can be stored in the corresponding location of next-pointer sideband 354.

Upon receiving the next data unit of packet 314, if any, EVB tracker 306 can store the next data unit at the next available location in virtual buffer 350 based on the pointer in next-pointer sideband 354. The information associated with IVC 1 of packet 314 (e.g., an IVC indicator of IVC 1) can be stored in the corresponding location of IVC sideband 352. In the same way, when another packet 318 belonging to EVC 1 arrives at egress port 140, EVB tracker 306 can store the first data unit of packet 318 at the next available location in virtual buffer 350 based on the pointer in next-pointer sideband 354. However, due to VC remapping, the IVC of packet 318 can be IVC 0. The information associated with IVC 0 of packet 318 can then be stored in the corresponding location of IVC sideband 352.

If egress port 140 receives packets 312 and 316 associated with EVC 0 and (m−1), respectively, EVB tracker 306 can store a respective data unit of packets 312 and 316 in the virtual buffers associated with EVC 0 and (m−1), respectively. The information associated with IVC 0 of packet 312 and IVC 2 of packet 316 can then be stored in the corresponding locations of IVC sideband 352. Based on a trigger (e.g., the arrival of destination credit for a VC or periodic checking), EVB scheduler 304 can determine whether sufficient destination credit 302 associated with a respective EVC is available. When sufficient destination credit is available for EVC 1 in credits 302 to forward packet 314, EVB scheduler 304 can obtain packet 314 from virtual buffer 350 and transmit packet 314 via port 128 one data unit at a time. Egress port 140 can also send an indicator indicating the validity of the packet and EVC 344 with packet 140.

In some embodiments, the read port of memory device 310 can support pipelining. As a result, a subsequent data unit of packet 314 can be read out of memory device 310 when port 128 transmits the previous unit of packet 314. Upon transmitting a respective data unit of packet 314, egress port 140 can notify the ingress port of packet 314 regarding IVC 342. Egress port 140 can determine the information associated with IVC 342 (e.g., a channel identifier of IVC 1) from the location in IVC sideband 352 that corresponds to a location of memory device 310 (or an external memory device) that has stored the data unit of packet 314. Based on this information, the ingress port can decrement the IVC counter associated with IVC 342 and egress port 140.

For example, if IVC 342 is IVC 1 and the ingress port is ingress port 120 of switch 104, IVC counter 232 is decremented at ingress port 120, as described in conjunction with FIG. 2. In this way, egress port 140 can notify the ingress port regarding the transmission of a respective data unit of packet 314. The ingress port, in turn, can decrement the corresponding IVC counter. Consequently, even if IVC 342 is remapped to EVC 344 for packet 314, egress port 140 can notify the ingress port based on the information associated with IVC 342 maintained in association with packet 314. This allows switch 104 to support credit allocation that facilitates efficient VC remapping.

Operations

Figure 4A:
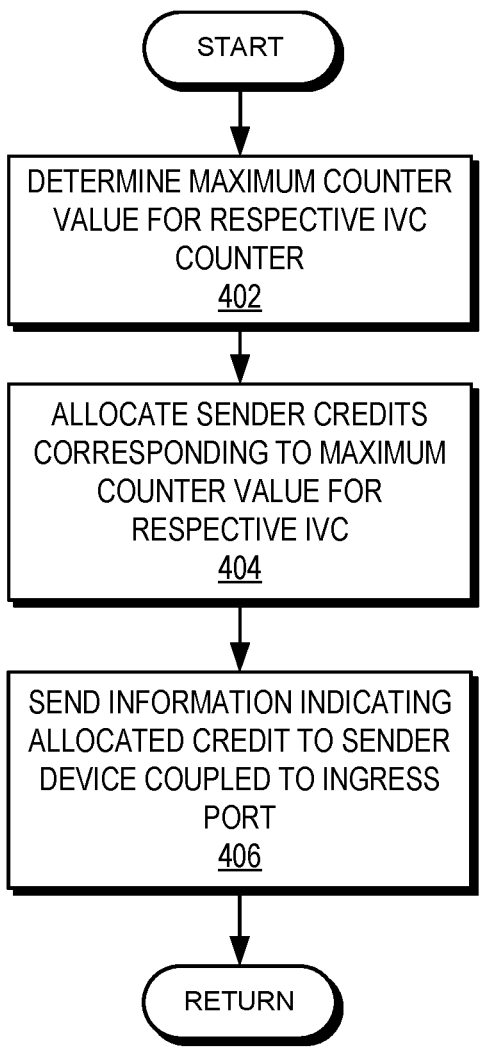
FIG. 4A presents a flowchart illustrating the process of an ingress port of a switch allocating initial credits, in accordance with an embodiment of the present application.

FIG. 4A presents a flowchart illustrating the process of an ingress port of a switch allocating initial credits, in accordance with an embodiment of the present application. During operation, the ingress port can determine a maximum counter value for a respective IVC counter (operation 402). The maximum counter value can indicate the maximum number of data units of a particular VC that the destination device can receive without overflowing the ingress buffer. The ingress port can then allocate sender credits corresponding to the maximum counter value for a respective IVC (operation 404). Subsequently, the ingress port can send information indicating the allocated credit to the sender device coupled to the ingress port (operation 406).

Based on this process, if the maximum counter value is y, the ingress port can allocate y credits for each IVC to the sender device. Since all received packets associated with a particular IVC may not be distributed across multiple destination devices and can be sent to a particular destination device, the ingress port can restrict the number of sender credits for an IVC to the maximum counter value for the initial allocation. In this way, even though the ingress port may not be aware of the destination of packets that have not been received yet, the ingress port can ensure that the packets sent to a particular destination device do not overwhelm the destination device. Hence, even if one destination device receives packets with data units corresponding to the maximum counter value, buffers of that destination device would not overflow.

Figure 4B:
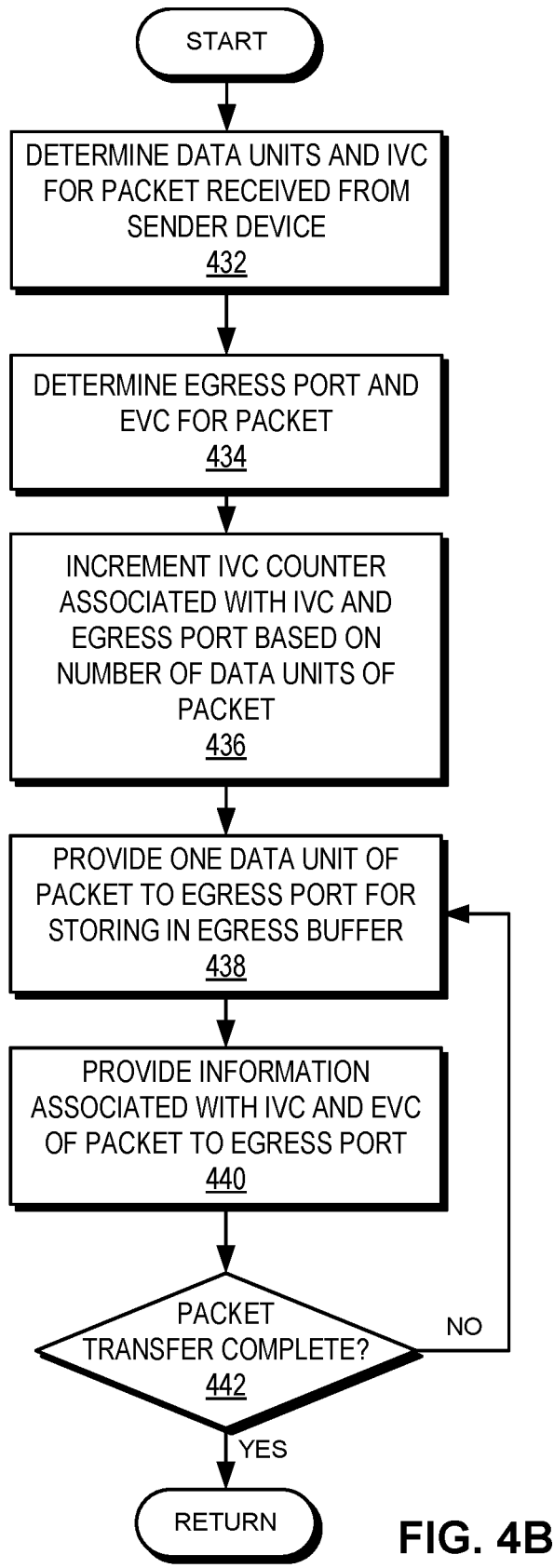
FIG. 4B presents a flowchart illustrating the process of an ingress port of a switch managing ingress VC (IVC) counters, in accordance with an embodiment of the present application.

FIG. 4B presents a flowchart illustrating the process of an ingress port of a switch managing IVC counters, in accordance with an embodiment of the present application. During operation, the ingress port can determine the data units and the IVC for a packet received from a sender device (operation 432), and determine an egress port and an EVC for the packet (operation 434). The ingress port can then increment the IVC counter associated with the IVC and the egress port based on the number of data units of the packet (operation 436). Subsequently, the ingress port can provide one data unit of the packet to the egress port for storing in an egress buffer (e.g., a virtual buffer associated with the EVC) (operation 438). The ingress port can also provide information associated with the IVC and EVC of the packet to the egress port (operation 440) and determine whether the packet transfer is complete (operation 442). If the packet transfer is not complete, the ingress port can continue to provide the subsequent data unit of the packet to the egress port for storing in the egress buffer (operation 438).

Figure 4C:
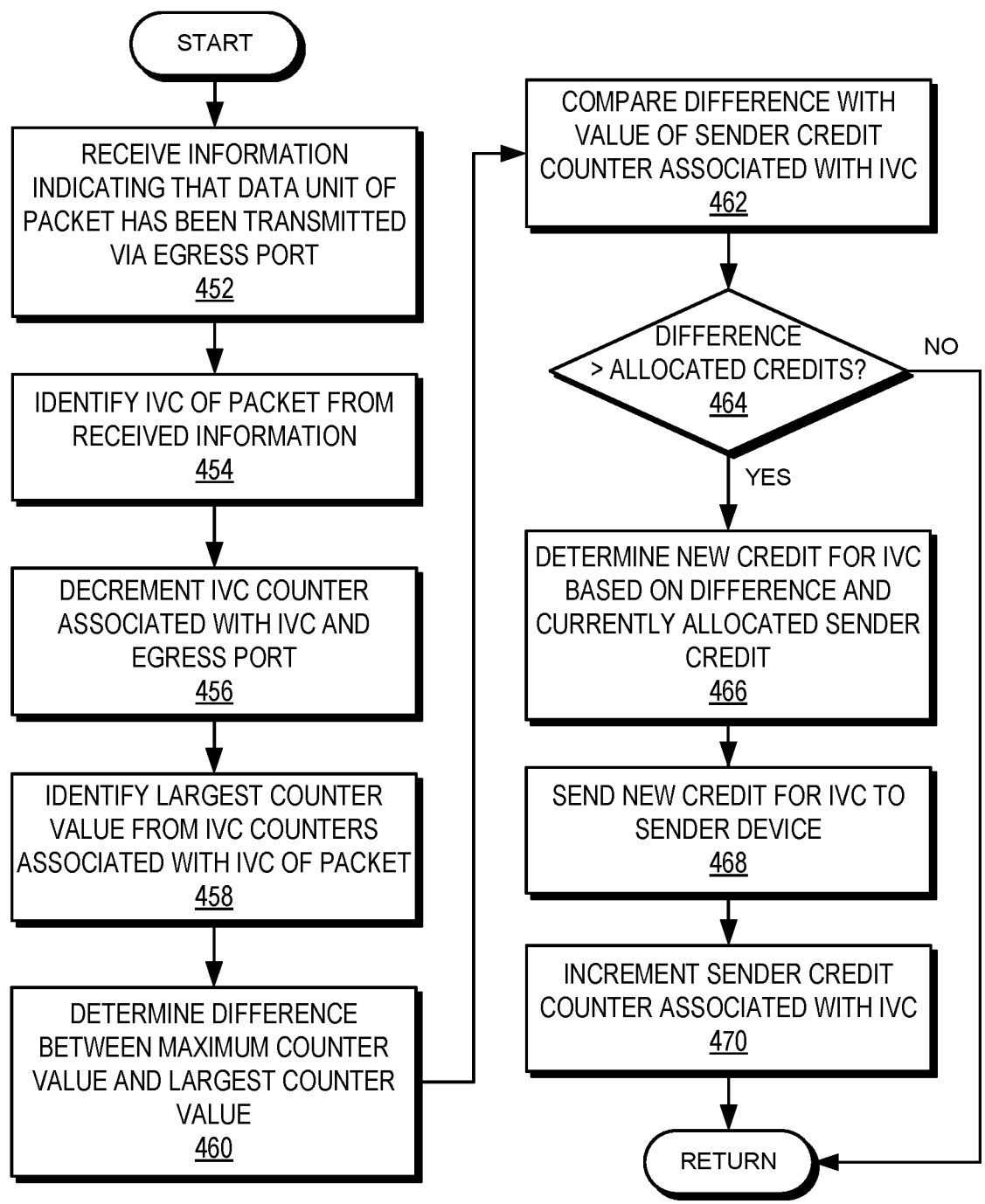
FIG. 4C presents a flowchart illustrating the process of an ingress port of a switch allocating credits based on IVC counters, in accordance with an embodiment of the present application.

FIG. 4C presents a flowchart illustrating the process of an ingress port of a switch allocating credits based on IVC counters, in accordance with an embodiment of the present application. During operation, the ingress port can receive information indicating that a data unit of a packet has been transmitted via an egress port (operation 452). The ingress port can identify the IVC of the packet from the received information (operation 454) and decrement the IVC counter associated with the IVC and the egress port (operation 456). The ingress port can then identify the largest counter value from the IVC counters associated with the IVC of the packet (operation 458). To do so, the ingress port may compare the values of the IVC counters associated with all egress ports for the IVC of the packet.

The ingress port can then determine a difference between the maximum counter value (i.e., the maximum value the IVC counter can take or count to) and the largest counter value (operation 460). The ingress port can then compare the difference with the value of the sender credit counter associated with the IVC (operation 462). The ingress port can determine whether the difference is greater than the allocated sender credit for the IVC, as indicated by the sender credit counter (operation 464). If the difference is greater than the allocated sender credit, the ingress port can determine new sender credits for the IVC based on the difference and the currently allocated sender credit (operation 466). Subsequently, the ingress port can send the new credit for the IVC to the sender device (operation 468) and increment the sender credit counter associated with the IVC (operation 470).

Figure 5A:
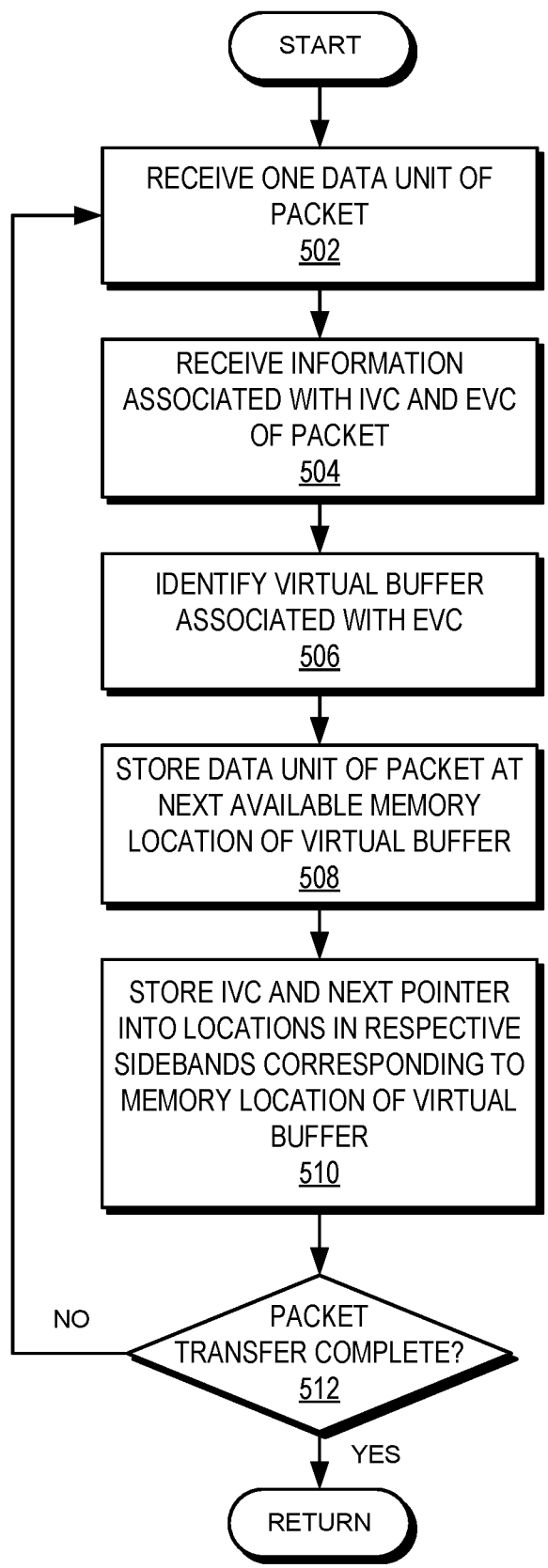
FIG. 5A presents a flowchart illustrating the process of an egress port of a switch storing packets and associated IVC information, in accordance with an embodiment of the present application.

FIG. 5A presents a flowchart illustrating the process of an egress port of a switch storing packets and associated IVC information, in accordance with an embodiment of the present application. During operation, the egress port can receive one data unit of a packet (operation 502). The egress port can also receive information associated with the IVC and EVC of the packet (operation 504). The egress port can then identify the virtual buffer associated with the EVC (operation 506) and store the data unit of the packet at the next available memory location of the virtual buffer (operation 508). Furthermore, the egress port can store the IVC information and a next pointer into locations in the respective sidebands corresponding to the memory location of the virtual buffer (operation 510). If the packet transfer is not complete (operation 512), the egress port can continue to receive the subsequent data unit of the packet (operation 502).

Figure 5B:
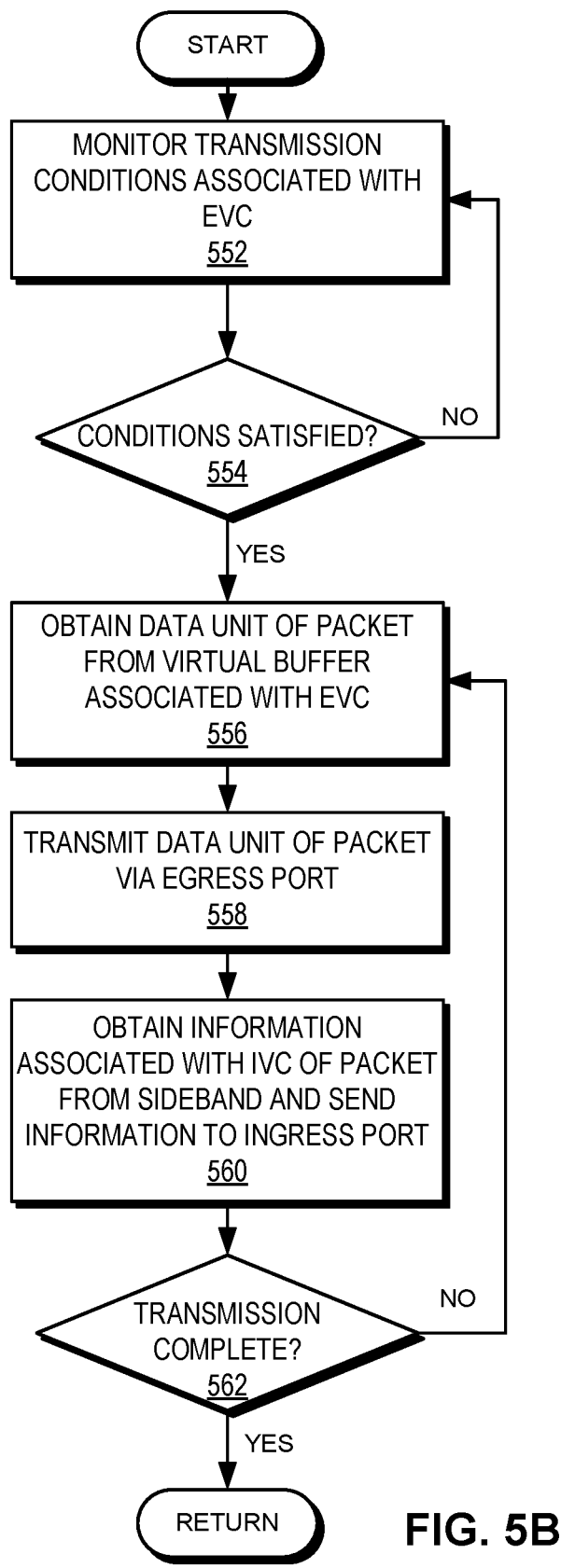
FIG. 5B presents a flowchart illustrating the process of an egress port of a switch providing IVC information of a transmitted packet, in accordance with an embodiment of the present application.

FIG. 5B presents a flowchart illustrating the process of an egress port of a switch providing IVC information of a transmitted packet, in accordance with an embodiment of the present application. This process can be repeated for a respective EVC of the switch. During operation, the egress port can monitor the transmission conditions associated with an EVC (operation 552) and determine whether the transmission conditions are satisfied for packet transmission (operation 554). If the transmission conditions are not satisfied, the egress port can continue to monitor transmission conditions associated with the EVC (operation 552).

The transmission conditions for sending a packet of an EVC via an egress port can include one or more of: the availability of sufficient destination credits associated with the EVC, availability of the egress port (e.g., the egress port is not currently transmitting another packet), and the EVC being selected for transmission (e.g., based on an arbitration mechanism, such as round-robin, demand-based, or capacity-based selection). In some embodiments, the egress port can be equipped with a plurality of egress buffers for facilitating differentiated packet transmission (e.g., based on the quality of service of a packet or a forwarding policy). The egress port can ensure forwarding progress and fair access to the destination for a respective egress buffer. Under such circumstances, the transmission conditions for sending a packet can also include selecting an egress buffer for transmission. In this way, the egress port can arbitrate across EVCs and egress buffers to select a packet for forwarding. Therefore, the egress port transmits a packet when a respective transmission condition is satisfied for a packet.

Accordingly, if the transmission conditions are satisfied, the egress port can obtain a data unit of a packet from the virtual buffer associated with the EVC (operation 556) and transmit the data unit of the packet via the egress port (operation 558). The egress port can obtain information associated with the IVC of the packet from the sideband and send the information to the ingress port (operation 560). The egress port can obtain the information from a location of the sideband that corresponds to the location of the data unit in the virtual buffer. The egress port can then determine whether the packet transmission is complete (e.g., based on the next pointer in the next-pointer sideband) (operation 562). If the packet transmission is not complete, the egress port can continue to obtain a data unit of a packet from the virtual buffer associated with the EVC (operation 556).

Exemplary Switch System

Figure 6:
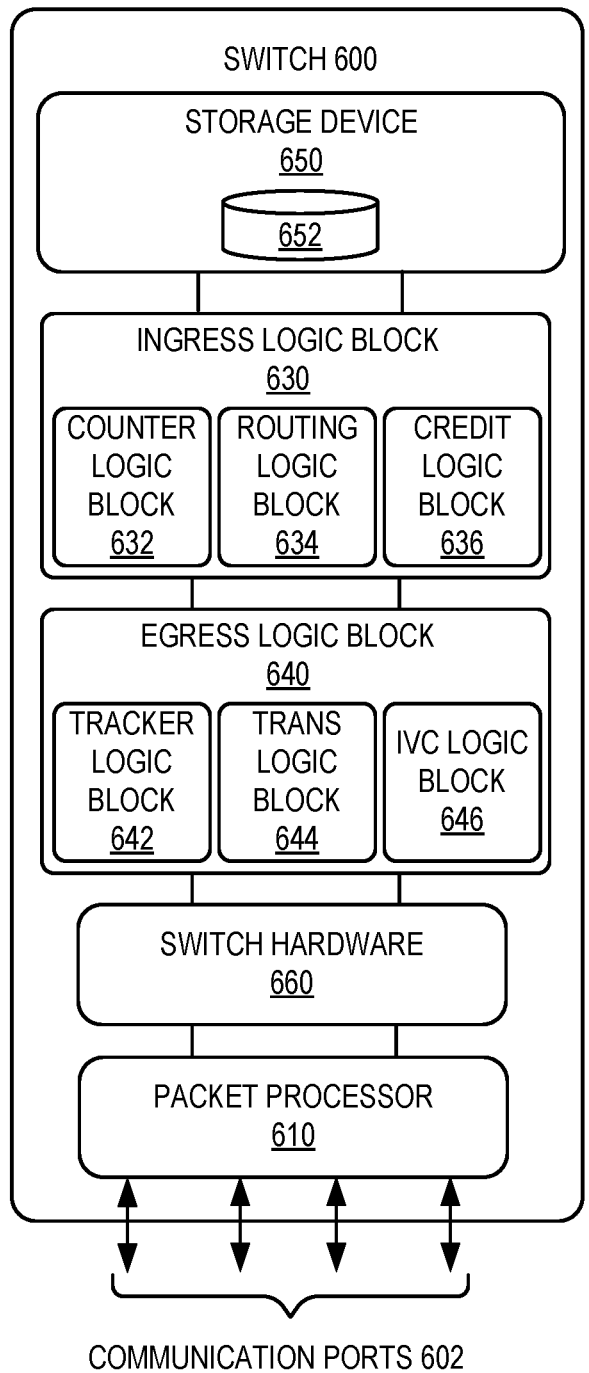
FIG. 6 illustrates an exemplary switch supporting efficient credit allocation for facilitating VC management and remapping, in accordance with an embodiment of the present application.

FIG. 6 illustrates an exemplary switch supporting efficient credit allocation for facilitating VC management and remapping, in accordance with an embodiment of the present application. In this example, a switch 600 includes a number of communication ports 602, a packet processor 610, an ingress logic block 630, an egress logic block 640, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Switch hardware 660 can include a dual-port memory device for a respective port. Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Switch 600 can maintain information associated with a respective VC in database 652. Ingress logic block 630 can facilitate the operations of an ingress port, as described in conjunction with FIG. 2. Egress logic block 640 can facilitate the operations of an egress port, as described in conjunction with FIG. 3.

Ingress logic block 630 can include a counter logic block 632, a routing logic block 634, and a credit logic block 636. Counter logic block 632 can maintain and update the IVC counters of an ingress port. Routing logic block 634 can facilitate the selection of an egress port and an EVC (e.g., to facilitate VC remapping) for a respective packet received at the ingress port. Routing logic block 634 can also provide a respective packet to the egress port. Credit logic block 636 can allocate sender credits for a respective IVC based on the IVC counters of the ingress port.

Egress logic block 640 can include a tracker logic block 642, a transmission logic block 644, and an IVC logic block 646. Tracker logic block 642 can store a respective data unit of a packet received at the egress port in a virtual buffer associated with the EVC of the packet. Tracker logic block 642 can also store the information associated with the IVC of the packet in an IVC sideband and the next-pointer information of the virtual buffer in a next-pointer sideband. Transmission logic block 644 can operate as the scheduler and determine whether sufficient destination credits are available for an EVC. If sufficient destination credits are available, transmission logic block 644 can obtain a respective data unit of a packet from a virtual buffer associated with the EVC and transmit the data unit via the egress port. IVC logic block 646 can notify the ingress port regarding the information associated with the IVC of the packet.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for allocating credits for a virtual channel (VC), the method comprising:
   maintaining, at an ingress port of a switch, a set of counters, wherein a respective counter indicates a number of data units queued at a corresponding egress port for an ingress VC, and wherein a data unit indicates a minimum number of bits needed to form a packet;
   maintaining, at an egress port, an ingress VC indicator indicating that a packet in an egress buffer for an egress VC corresponds to the ingress VC;
   in response to sending the packet via the egress port from the egress buffer, updating a counter of the set of counters based on the ingress VC indicator, wherein the counter is associated with the egress buffer and the ingress VC; and
   issuing, to a sender device, credits associated with the ingress VC based on a minimum number of available data units indicated by the set of counters.

2. The method of claim 1, further comprising sending, from the egress port to the ingress port, a notification indicating packet transmission associated with the ingress VC.

3. The method of claim 1, wherein a respective VC indicates a class of traffic at the switch.

4. The method of claim 1, further comprising:
   sending the packet, the ingress VC indicator, and an egress VC indicator from the ingress port to the egress port; and
   identifying the egress buffer based on the egress VC indicator.

5. The method of claim 4, wherein sending the packet from the ingress port to the egress port comprises sending a respective data unit of the packet individually, wherein the ingress VC indicator and an egress VC indicator is sent with the data unit.

6. The method of claim 1, wherein a respective egress buffer associated with a corresponding egress VC is stored in a shared memory device in the egress port.

7. The method of claim 6, further comprising:
   storing the ingress VC indicator in a sideband of the shared memory device; and
   obtaining the ingress VC indicator based on a memory location of the packet in the egress buffer.

8. The method of claim 1, further comprising, in response to receiving the packet from the sender device, incrementing the counter by a number of data units in the packet; and wherein updating the counter comprises decrementing the counter by a respective data unit of the packet sent by the egress port.

9. The method of claim 1, further comprising:
   determining a largest counter value from the set of counters; and
   determining a difference between a maximum counter value and the largest counter value as the minimum number of available data units for the ingress VC.

10. The method of claim 1, further comprising:
    determining a number of pending credits allocated to the sender device for the ingress VC; and
    in response to the minimum number of available data units for the ingress VC being larger than the number of pending credits, issuing the credits associated with the ingress VC.

11. A computer system, comprising:
    a processor;
    a set of ingress ports;
    a set of egress ports;
    a non-transitory computer-readable storage medium storing instructions, which when executed by the processor causes the processor to perform a method allocating credits for a virtual channel (VC), the method comprising:
       maintaining, at an ingress port, a set of counters, wherein a respective counter indicates a number of data units queued at a corresponding egress port for an ingress VC, and wherein a data unit indicates a minimum number of bits needed to form a packet;
       maintaining, at an egress port, an ingress VC indicator indicating that a packet in an egress buffer for an egress VC corresponds to the ingress VC;
       in response to sending the packet via the egress port from the egress buffer, updating a counter of the set of counters based on the ingress VC indicator, wherein the counter is associated with the egress buffer and the ingress VC; and
       issuing, to a sender device, credits associated with the ingress VC based on a minimum number of available data units indicated by the set of counters.

12. The computer system of claim 11, wherein the method further comprises sending, from the egress port to the ingress port, a notification indicating packet transmission associated with the ingress VC.

13. The computer system of claim 11, wherein a respective VC indicates a class of traffic at the switch.

14. The computer system of claim 11, wherein the method further comprises:
    sending the packet, the ingress VC indicator, and an egress VC indicator from the ingress port to the egress port; and
    identifying the egress buffer based on the egress VC indicator.

15. The computer system of claim 14, wherein sending the packet from the ingress port to the egress port comprises sending a respective data unit of the packet individually, wherein the ingress VC indicator and an egress VC indicator is sent with the data unit.

16. The computer system of claim 11, wherein a respective egress buffer associated with a corresponding egress VC is stored in a shared memory device in the egress port.

17. The computer system of claim 16, wherein the method further comprises:
    storing the ingress VC indicator in a sideband of the shared memory device; and obtaining the ingress VC indicator based on a memory location of the packet in the egress buffer.

18. The computer system of claim 11, wherein the method further comprises, in response to receiving the packet from the sender device, incrementing the counter by a number of data units in the packet; and wherein updating the counter comprises decrementing the counter by a respective data unit of the packet sent by the egress port.

19. The computer system of claim 11, wherein the method further comprises:

determining a largest counter value from the set of counters; and determining a difference between a maximum counter value and the largest counter value as the minimum number of available data units for the ingress VC.

20. The computer system of claim 11, wherein the method further comprises:

determining a number of pending credits allocated to the sender device for the ingress VC; and in response to the minimum number of available data units for the ingress VC being larger than the number of pending credits, issuing the credits associated with the ingress VC.

* * * * *